United States Patent [19]

Pasterkamp

[11] 4,423,360

[45] Dec. 27, 1983

[54] DEVICE FOR CONTROLLING THE SYNCHRONISM OF TWO MOTORS

[75] Inventor: Klaas Pasterkamp, Huizen, Netherlands

[73] Assignee: Moba Holding Barneveld B.V., Barneveld, Netherlands

[21] Appl. No.: 370,528

[22] Filed: Apr. 21, 1982

[30] Foreign Application Priority Data

Apr. 28, 1981 [NL] Netherlands .................... 8102072

[51] Int. Cl.³ ............................................. H02P 5/50
[52] U.S. Cl. ..................................... 318/85; 318/77
[58] Field of Search ................................. 318/41–45, 318/69, 76, 8, 85, 77

[56] References Cited

U.S. PATENT DOCUMENTS

| | | | |
|---|---|---|---|
| 3,133,236 | 5/1964 | McCauley | 318/77 |
| 3,135,905 | 6/1964 | Malcho | 318/77 |
| 3,519,883 | 7/1970 | Morey | 318/76 |
| 4,135,118 | 1/1979 | Seeger et al. | 318/85 |
| 4,289,996 | 9/1981 | Barnes et al. | 318/8 |
| 4,350,936 | 9/1982 | Jackson | 318/45 |

*Primary Examiner*—B. Dobeck
*Assistant Examiner*—A. Evans
*Attorney, Agent, or Firm*—Larson and Taylor

[57] ABSTRACT

Device for synchronizing two asynchronous rotary field motors, the output of said motors being via reduction gears connected to the movable parts of synchronizers of for instance the selsyn type, said synchronizers being connected to generate a correction signal dependent on direction and value of a positional difference between the said movable parts, said motors being controlled by a frequency converter the output frequency of which is controlled by an electrical input, at least one of said inputs being combined with said correction signal, R.C.-circuits controlling the time function of the said electrical inputs.

5 Claims, 1 Drawing Figure

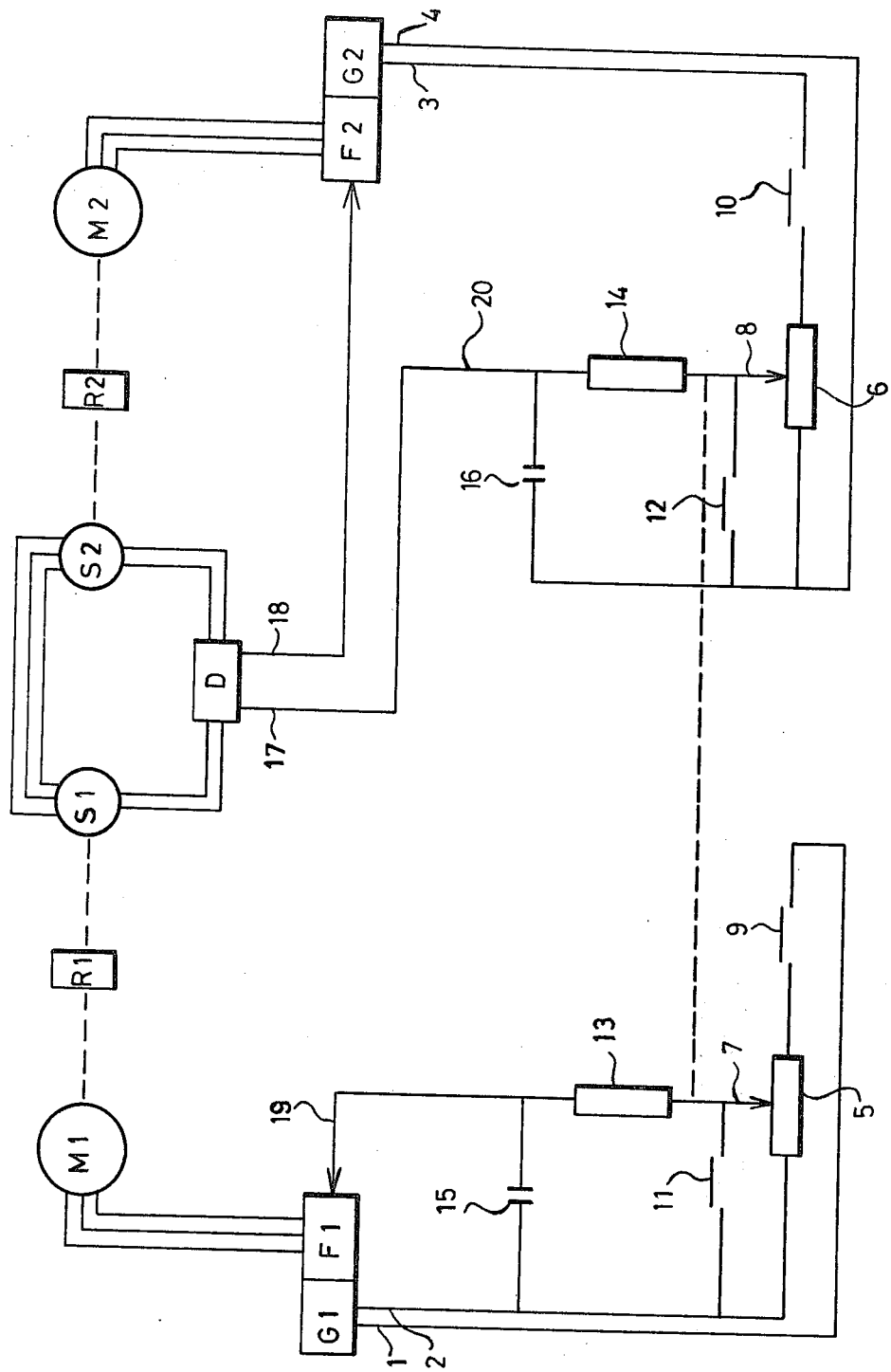

DEVICE FOR CONTROLLING THE SYNCHRONISM OF TWO MOTORS

The invention relates to a device for controlling a first motor and a second motor such that they run synchronously, in which the first motor and the second motor each drive a member that via a reduction gear is connected to the rotor of a position synchronizer, the outputs of the position synchronizer being compared in a discriminator, said discriminator giving an output signal that depends on the positional difference of the rotors of the synchronizers and is used for controlling at least one of the motors.

Control for causing a master motor and a slave motor to run synchronously, also called an electrical shaft, is realized in different ways. A system, in which a phase difference signal is deduced and used for exactly maintaining synchronism is mentioned in the Dutch Patent Application No. 7204555 to Borg-Warner Corporation. Further this publication shows a system in which a rather complicated signal comparing and handling facility causes two motors to run synchronously. A predetermined phase difference of these motors can be adjusted by electrical means. It is, however, necessary that the load of the motors cannot vary too much, because then a loss of synchronism occurs.

The condition under which the motors have to work can, however, be quite different, wherewith specially the case may occur that the load of the motors at the moment of switching on and off is not the same and a temporarily lack of synchronism of them can lead to an undesired working. Finally it is important that the starting and stopping runs of the motors happen reproducibly and smoothly.

An example of such motors is a handling machine, for instance an egg grading machine, wherewith the one motor is loaded almost continuously and drives the grading apparatus, whereas the other motor is very variably loaded because it serves the feeding apparatus which works intermittently. In this instance the difficulty occurs that if the motors temporarily are not synchronous the possibility exists that the feeding apparatus feeds eggs to the grading device when the latter is not in a suitable position for receiving eggs, which evidently may incur undesired results.

A good solution of the above indicated problems is possible by using direct current motors. These are, however, expensive in comparison with for instance asynchronous motors with a rotating field and moreover need brushes and also for this latter reason need considerably more service.

In such a system the rotor current is controlled under influence of a tachometer and the position of the rotors of the synchronizers, wherewith to obtain a so-called dynamical brake action the four quadrats system has to be used which in itself is expensive.

D. Osterhaut et al.: "Control of a glass forming process using individual inverter drives and static differential techniques" IEEE INDUSTRY APPLICATION SOCIETY, 12th ANNUAL MEETING, pages 322-325 depicts a synchronizing system using synchronous motors. A phase determination is obtained from the motors and inverters controlling them. Synchronous motors, however, are rather dependent on their load condition in order to prevent drop-out of synchronism.

Another solution exists in the use of an eddy current coupling and rotary current motors. An eddy current coupling can react quickly, so that in this way a sufficient control expedient can be obtained. However, a disadvantage of this system is, apart from the application of the eddy current coupling, the smaller energy efficiently and difficulties with dynamically braking, because an eddy current coupling cannot transmit energy from the driven member to the driving member.

The invention provided a solution with which the above mentioned difficulties are prevented and which enables the use of asynchronous rotary-current motors without the need of eddy current couplings and tachometers, wherewith in the above indicated difficult case of an egg grading machine with a separately driven motor for a feeding web very uniform starting and stopping movements are obtained when maintaining a very good synchronization with a costprice of the apparatus which is considerably below that of the known solutions.

According the invention the above mentioned aims are realized in that the motors are asynchronous rotary-current motors, which each are fed via a controllable frequency converter and that a signal corresponding to the said output signal is fed to one of the said frequency converters.

It is pointed to the fact that frequency converters which are suitable for application of the invention are commercially available and for instance marketed by the firm Lenze K. G. at Hameln, Western-Germany. Such frequency converters rectify the mains' voltage and give by means of chopping the d.c. voltage a three phase current the frequency of which depends on an input signal fed to the frequency converter. In many instances such an input signal is a d.c. voltage signal.

The discriminator which with application of the invention can be used is also commercially available, as well as position synchronizers. Such a discriminator gives an output signal the sign of which is dependent on the direction and the magnitude of the positional difference of the rotors of the synchronizers. This voltage is generated in such a form, that it can be added to a voltage which is used as control voltage of one of the frequency converters.

Switching-on of both motors which at this moment may be unequally loaded, wherewith also the load value of both motors may differ in different instances, happens preferably by feeding a control voltage to the frequency convertors via a RC-circuit. Then the retardation time of this circuit gives the possibility to have the starting movements of the motors to occur according a desired program.

An embodiment in which the final rotational velocity of the motors, which depend on the final voltage fed to the frequency converters, can be made adjustable consists in that each motor has a switching-on and -off circuit containing an adjustable potentiometer to which a constant d.c. voltage can be fed, a contact for applying the d.c. voltage to a terminal of the potentiometer and a R.C. element between the moving member and the other terminal of the potentiometer.

A simple circuit wherewith different starting and stopping characteristics can be realized consists in that a further contact is present, which closes when the first mentioned contact opens and vice versa, which further contact is mounted between the moving member of the potentiometer and the other terminal of the potentiometer.

When switching off the motors a dynamical bracking action occurs via the frequency converters, but not recuperation that is to say no feeding back of energy to the mains is obtained. Also the dynamical braking action should not be too strong in order to prevent overloading of the frequency converters. These are additional reasons for controlling the stopping movement of the motors.

The invention in the following is elucidated in connection with the single drawing in which schematically an embodiment of the invention has been shown.

In the drawing G1 and G2 are rectifiers feeding frequency converters F1 and F2 respectively. The rectifiers supply by means of contacts 1 and 2 and 3 and 4 respectively control d.c. voltages that are fed to potentiometers 5 and 6 respectively having movable members 7 and 8 respectively which may be mechanically ganged in order to obtain an equable adjustment the starting characteristics of both motors. Each of the starting circuits has a contact 9 and 10 respectively, that is closed when switching on the motors, so that then the potentiometers 5 and 6 respectively receive a voltage of which a part is taken off by the movable member 7 and 8 respectively. Further the contacts 11 and 12 respectively are opened when the contacts 9 and 10 respectively are closed and they are closed when 9 and 10 are opened. Further resistors 13 and 14 are present, which are connected to timing condensors 15 and 16 respectively.

When switching on the system there is provided by the elements 5, 7, 13, 15 and 6, 8, 14, 16 respectively a predetermined voltage characteristic, which occurs on conductors 19 and 20 respectively and can be used for controlling the motors. The motors M1 and M2 are fed by the frequency converters F1 and F2 and are mechanically coupled with reduction gears R1 and R2 respectively, which in turn are mechanically coupled to position synchronizers S1 and S2 respectively the stator windings of which are connected with each other whereas the rotor windings are connected to the discriminator D, which generates a d.c. voltage signal between terminals 17 and 18 that corresponds to the positional difference between the rotors of the synchronizers S1 and S2.

When the rotors of the synchronizers S1 and S2 take unequal positions a signal corresponding to this positional difference is added to the signal issued by the RC-circuit 6, 8, 14 and 16 in that direction in which the frequency converter F2 is controlled such that is striven for elimination of the positional difference between the rotors of S1 and S2.

When switching off the contacts 11 and 12 are opened, so that another RC-circuit is present than with switching on, which gives the possibility to let switching off occur with a characteristic differing from that for switching on. The units G1, F1 and G2, F2 respectively are provided with means not shown which cause an interruption of the feeding of motors M1 and M2 with very low control voltage. In a way known per se herewith is obtained that the motors, when they have reached a predetermined low number of revolutions stop quickly, which is, as experience has shown, not only permissable but also desirable. However, this possibility of frequency converters is known.

Summarizing it can be put that with the invention in a simple and inexpensive way the motors can be switched on according to a first characteristic to wit with the contacts 9 and 10 closed and 11 and 12 opened and afterwards be switched off with another characteristic to wit with closed contacts 11 and 12. By an inherent feature of the frequency converters a dynamical braking action occurs if the motors rotate faster than corresponds to the reduction of the frequency emitted by the frequency converters F1 and F2. The Synchronisation obtained is also with very unequal loads, amply sufficient and the working is, as practice has shown extremely free of shocks and jerks when maintaining more than sufficient synchronism.

What I claim is:

1. Synchronizing system for two electric motors each having a feed control means in which a control signal is deduced from the positional difference of both motors by means of a comparator means and this signal is fed to the feed control means of at least one motor in which the motors are asynchronous rotary field motors the output of each motor being connected to a reduction gear the output of each reduction gear being mechanically connected to the rotor of a synchronizer having a rotor and stator, the stators of said synchronizers being connected to a discriminator for generating an output signal, the feed control means of each motor comprising a frequency converter controlled by an input signal, and the said output signal being combined with the input signal of at least one of said frequency converters in such a way that the positional difference of the motors is counteracted.

2. A synchronizing system for two electric motors, each having a feed control means, in which a control signal is deduced from the positional difference of both motors by means of a comparator means and this signal is feed to the feed control means of at least one motor, in which the motors are asynchronous rotary field motors, the output of each motor being connected to a reduction gear, the output of each reduction gear being mechanically connected to the rotor of a synchronizer having a rotor and stator, the stators of said synchronizers being connected to a discriminator for generating an output signal, the feed control means of each motor comprising a frequency converter controlled by an input signal, and the said output signal being combined with the input signal of at least one of said frequency converters in such a way that the positional difference of the motor is counteracted, the said output signal being a dc voltage and being added to the input signal of at least one of the frequency converters, and the said input signal of said at least one frequency converter being a dc voltage.

3. Device according to claim 2, in which RC-circuits connected to the control inputs of the frequency converters.

4. Device according to claim 3, in which each motor is provided with a circuit for providing on and off switching, each of said circuits containing an adjustable potentiometer the terminals of which are connectable to a source of predetermined d.c. voltage, a first contact for providing this connection and an RC circuit connected between the movable contact of the potentiometer and one of its terminals.

5. Device according to claim 4, in which a further contact is arranged to be closed when the first contact is opened and vice versa, which further contact is located between the movable contact of the potentiometer and the said one of its terminals.

* * * * *

UNITED STATES PATENT AND TRADEMARK OFFICE
CERTIFICATE OF CORRECTION

PATENT NO. : 4,423,360
DATED : December 27, 1983
INVENTOR(S) : PASTERKAMP

It is certified that error appears in the above—identified patent and that said Letters Patent is hereby corrected as shown below:

In the cover page of the patent, upper left hand side, after "Assignee:" please delete "Moba Holdings, Barneveld B.V., Netherlands" and substitute therefor

--ADMINISTRATIE - EN AUTOMATISERINGSCENTRUM VULCAAN

B.V., Amsterlveen, Netherlands--

Signed and Sealed this

Twenty-third Day of April 1985

[SEAL]

Attest:

DONALD J. QUIGG

Attesting Officer  Acting Commissioner of Patents and Trademarks